United States Patent [19]

Burk et al.

[11] 3,825,904

[45] July 23, 1974

[54] VIRTUAL MEMORY SYSTEM

[75] Inventors: John L. Burk, Poughkeepsie; Daniel M. Duffy, Hyde Park; Spurgeon G. Hogan, Jr., Poughkeepsie; Russell H. Larson, Wappingers Falls; Bruce L. McGilvray, Pleasant Valley, all of N.Y.

[73] Assignee: International Business Machines Corporation, Armonk, N.Y.

[22] Filed: June 8, 1973

[21] Appl. No.: 368,544

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,533,075 | 10/1970 | Johnson et al. | 340/172.5 |
| 3,614,746 | 10/1971 | Klinkhamer | 340/172.5 |
| 3,638,199 | 1/1972 | Kolankowsky et al. | 340/172.5 |
| 3,675,215 | 7/1972 | Arnold et al. | 340/172.5 |
| 3,693,165 | 9/1972 | Reiley et al. | 340/172.5 |
| 3,723,976 | 3/1973 | Alvarez et al. | 340/172.5 |
| 3,761,881 | 9/1973 | Anderson et al. | 340/172.5 |

*Primary Examiner*—Harvey E. Springborn
*Attorney, Agent, or Firm*—James E. Murray

[57] ABSTRACT

This specification describes a virtual memory system in which a set of conversion tables is used to translate an arbitrarily assigned programming designation called a virtual address into an actual main memory location called a real address. To avoid the necessity of translating the same addresses over and over again, a table called the Directory Look Aside Table (DLAT) retains current virtual to real address translations for use where particular virtual addresses are requested more than once. The DLAT not only stores translations of requested address but also stores translations of addresses that immediately precede or succeed the requested address in the virtual address sequence in anticipation of their being requested. Furthermore, to simplify the translation process data obtained from the translation table during the last translation is stored in anticipation of its use in the next request for translation.

5 Claims, 9 Drawing Figures

VIRTUAL MEMORY SYSTEM

INTRODUCTION

BACKGROUND OF THE INVENTION

This invention relates to computer storage systems and more particularly to computer storage systems including a virtual memory system for converting a virtual address to a real physical address.

Various techniques are known whereby several computer programs, executed either by a single central processing unit or by a plurality of processing units, share one memory. A memory being shared by programs in this manner requires an extremely large storage capacity, a capacity which is often larger than its actual capacity. To accommodate this situation the concept of "virtual storage" is employed. If, for example, a system employs a 24 bit addressing scheme $2^{24}$ bytes or approximately 16 million addressable bytes of virtual storage are available. This virtual storage is divided into segments each of which is divided into pages, with each page consisting of a predetermined number of bytes. The segment and page addresses assigned to virtual storage are arbitrary programming designations and are not actual locations in main storage. Therefore, virtual segments and pages can be located randomly throughout main storage and swapped in and out of main storage as they are needed.

Random location of segments and pages in main storage necessitates the translation of virtual address into actual address using a set of conversion tables that are located in main storage. In a virtual memory system a number of sets of conversion tables are employed, each made up of a segment table and a number of page tables. Each page table in a set of conversion tables reflects the real locations of all the pages of one segment in the segment table. Therefore, if a particular segment table is divided into sixteen segments, there would be sixteen page tables and one segment table in the set of conversion tables in performing a translation.

In making a translation, the proper set of conversion tables is selected and the segment table in the set of conversion tables is used to find the location of the page tables in the real memory. The proper page table is then used to find the real location of the addressed page. The byte portion of a virtual address refers to a real location in memory so that once the segment and page portions of the virtual address have been translated to give a page location the byte portion is concatenated onto the page location to give the real address in main storage.

To avoid having to translate an address each time the memory is accessed, previously requested translations of virtual addresses to real addresses are retained in another table called the Directory Look Aside Table (DLAT) where such addresses can be obtained with a virtual address without going through the described translation process. As pointed out in copending application Ser. No. 298,190, filed Oct. 17, 1972, and assigned to the same assignee, the use of the DLAT significantly reduces the number of translations that must be made and thus has a considerable effect on the performance of the virtual memory system. However, it should be apparent that, no matter how many translations of previously requested virtual addresses that you store, requests for previously unused virtual addresses will be made in a virtual memory system. When such a request is made, a new translation must be provided. This requires a significant amount of time thus reducing the efficiency of the virtual memory system.

SUMMARY OF THE PRESENT INVENTION

In accordance with the present invention, the average time necessary to perform a translation is reduced. This is accomplished in two ways. First, virtual addresses are arranged in pairs and when one is requested both are translated. Both translations are then placed in the DLAT where they are available for use. The assumption made here is that when one of the pair of addresses is called for it is very likely that the other address will also be used. Since it is much quicker to translate the two addresses together than the two separately a significant saving in translation time is obtained. The second way in which time is saved is by saving the data that was accessed from the segment table the last time a virtual address was translated under the assumption that the same segment of data will be referred to again. This eliminates the necessity of locating the segment thus reducing the translation steps so as to save time.

Therefore, it is an object of the present invention to reduce the time a virtual memory uses in making translations.

Another object of the present invention is to reduce the translation time of virtual address to a real address by performing the translation on two or more addresses simultaneously.

Still another object of the present invention is to reduce the translation time of a virtual address to a real address by storing data obtained by some intermediate step of the translation process.

The foregoing and other objects, features and advantages of the present invention will be apparent from the following description of a preferred embodiment of the invention as illustrated in the accompanying drawings of which:

DETAILED DESCRIPTION

Figure 1:
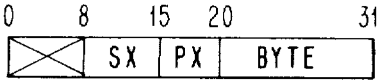
FIG. 1 shows a preferred format for a virtual address.

Since the invention resides primarily in the novel structural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

VIRTUAL ADDRESS

Referring to FIG. 1, a preferred format for a virtual address is shown. The 24 bit virtual address is divided into three fields: a segment field (SX) which occupies bits 8–15; a page field (PX) which occupies bits 16–20; and a byte field which occupies bits 21–31. With this format, the virtual storage consists of 256 segments, with each segment consisting of up to 32 pages, and each page consisting of up to 2048 bytes. Those skilled in the art will, of course, recognize that these field definitions are somewhat arbitrary in nature. For example, one could define the virtual address fields so that SX occupied bits 8–11, PX occupied bits 12–19, and BYTE occupied bits 20–31. With such a format, the virtual storage would consist of sixteen segments with each segment consisting of up to 256 pages, and each page consisting of up to 4096 bytes. Bits 0–7 are not used in this preferred embodiment, but could optionally be used to extend the virtual address to provide a thirty-two bit addressing system. Such a system would have over four billion bytes of virtual memory. The segment field serves as an index to an entry in the segment table. The segment table entry contains a value which represents the base address of the page table associated with the segment designated by the segment field. The page field serves as an index to an entry in the page table. The page table entry contains a value which represents the actual or real address of the page. The byte field undergoes no change during translation, and is concatenated with the translated page address to form the actual or real main storage address.

ADDRESS TRANSLATION

Figures 2, 3:
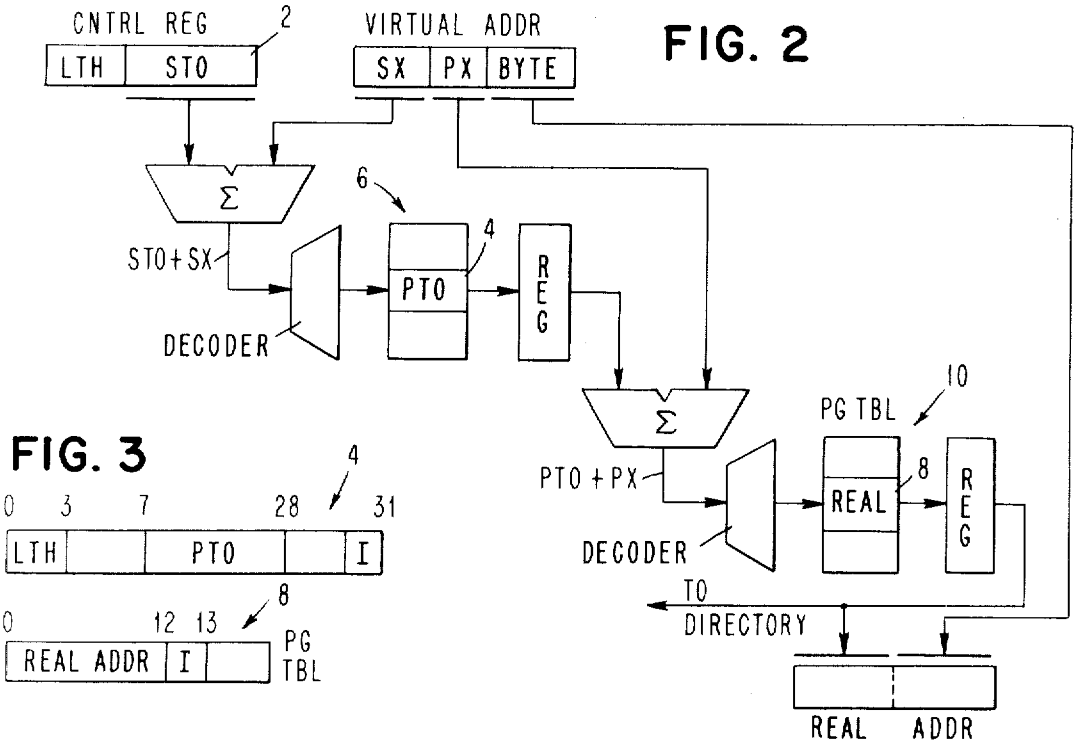
FIG. 2 is a diagramatic representation of virtual-to-real address translation.
FIG. 3 shows preferred formats for segment table entries and page table entries.

The translation process will be further clarified by reference to FIG. 2. The translation process is a two-level table look-up procedure involving segment and page tables for main storage. The segment address portion (SX) of the requested virtual address is added to a Segment Table Origin (STO) address stored in a control register 2 in order to obtain a segment table entry 4 from the segment table 6. (Control register 2 will also generally contain the length [LTH] of the segment table.) This segment table entry will contain a Page Table Origin (PTO) address which is added to the page address portion (PX) of the virtual address to provide the address of page table entry 8 within the page table 10. Since the page table entry is only two bytes wide, both the addressed entry and its mated pair entry will be translated and saved in the TLAT. Page table entry 8 will contain a real address which is concatenated with the byte portion of the virtual address to form a real address. One of these translations corresponds to the requested virtual address. The other corresponds to the virtual address with the next higher or lower page address in the binary addressing sequence. Thus, if bit 20 in the requested virtual address ended in a binary 0 the other virtual address read out would be identical for bits 8–19 and would have a binary 1 in the 20th bit position. Thus, only the 16–19 bits of the page portion of the virtual address are needed to address the page table.

To avoid repeating this translation process for every storage reference, a directory is provided for storing a portion of the virtual address along with the corresponding real address which were read from the page table with that segment. The directory will be continually updated to contain the virtual and real page addresses of recently referenced pages. Consequently, at the beginning of a translation, the virtual page address under translation will be checked against the directory to see if the real address is already available. If it is, the directory will provide the real page address which will be concatenated with the byte portion of the virtual address to form the real main storage address. If the address under translation is not found in the directory, it will undergo translation as described above and will be placed in the directory along with its real address. The reason for translating the two virtual addresses at the same time is because the two translations made together take less time than when they are done separately and the likelihood that both will be used when one is requested is very high.

FIG. 3 shows a preferred embodiment for segment table entries 4 and page table entries 8. For each virtual address space, there is a segment table, with corresponding page table. The origin and length of the active segment table is contained in the control register (FIG. 2). The segment table entry 4 contains a length (LTH) field in bits 0–3 which designates the length of the page table in increments that are equal to a sixteenth of the maximum size. Bit 31, the I bit, indicates the validity of the information contained in the segment table entry. When the I bit is on, the entry cannot be used to perform translations. The page table entry 8 contains, in bit positions 0–12, the high order thirteen bits of the real storage address. (The lower order real bits of the virtual address are concatenated to the high order bits from the page table to provide the byte displacement within the page.) There is also an I (invalidity) bit associated with each page table entry. When the I bit is on, the entry cannot be used to perform translations.

Translation Look Aside Table (TLAT)

As pointed out above, current translations of virtual addresses to real addresses are retained in a table to avoid having to translate an address each time the memory is accessed. This table is called the Translation Look Aside Table (TLAT) which is shown in broad schematic form in FIG. 4. The virtual address 12 provided by the CPU simultaneously interrogates a Translation Look Aside Table (TLAT) 14 and a buffer directoy 16. TLAT 14 contains recently translated virtual addresses along with their corresponding real addresses. The TLAT 14 is divided into odd and even sections **14*a* and 14*b* respectively with all the translations virtual addresses with a 0 in the twentieth bit position being placed in the even section 14*b* and all virtual addresses with a binary 1 in the twentieth bit position being placed in the odd section 14*a*. The buffer directory 16 contains the real addresses of data that have been mapped into the high speed buffer. Like the TLAT 14, the buffer directory 16 is divided into two sections with one section 16*a* containing all addresses with a 0 real address bit in the twentieth bit position and the other section 16b containing all addresses with a binary 1 in the twentieth bit position. The tables contained in the TLAT and in the buffer directory may be arranged and accessed in any of several known manners. For example, such could be an associative storage array, or an addressable storage array that is addressed by bits contained in the virtual address where the TLAT is addressed by bits coming from the virtual portion of the address and the directory is accessed by bits coming from the real portion of the address. Since it will most generally be preferable to use only a portion of the virtual address to access the TLAT 14, the portion of the virtual address that was not used for the access will be read from the virtual address portion of the TLAT and compared to the corresponding portion of the CPU-provided virtual address 12 by a comparator 18. In order to ensure that the data mapped into the high speed buffer is the data requested by the virtual address 12, the real address read from the TLAT 14 is compared to the real address read from the buffer directory 16 by comparator 20. The outputs of comparators 18 and 20 are fed to an AND circuit 22, which will generate an output signal on line 24 if the requested data is the high speed buffer. Appropriate (real) portions of the virtual address and the real address will be fed via lines 26 and 28 to the buffer storage address register 30 so that the data may be addressed from the buffer. If a real address which corresponds to the virtual address 12 is contained in the TLAT 14, but the data is not in the high speed buffer, the output of comparator 10, after inversion by inverter 32, combined with the output of comparator 18 will cause AND circuit 34 to generate a signal on line 36 indicating that a main storage reference is required. If the virtual address 12 does not match a virtual address contained in the TLAT 14, the output of comparator 18 will cause AND-I invert circuit 38 to generate a signal on line 40 which will indicate to the system that the translation process described above with respect to FIG. 2 must be initiated. Specific implemantations of the manner in which the contents of buffer storage address register 30 and the signal on line 24 may be used to initiate a buffer access cycle, as well as the manner in which the signals on lines 36 and 40** may be used to initiate appropriate system responses, are well known to those skilled in the art and need not be described herein.

Figure 4:
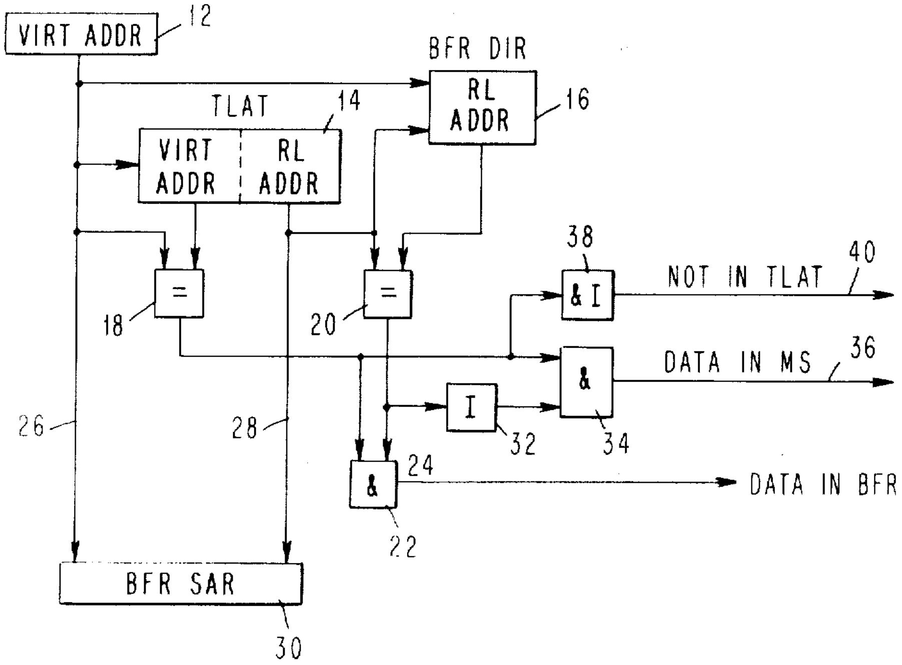
FIG. 4 is a schematic block diagram illustrating how translations are stored and retrieved.
Figure 5:
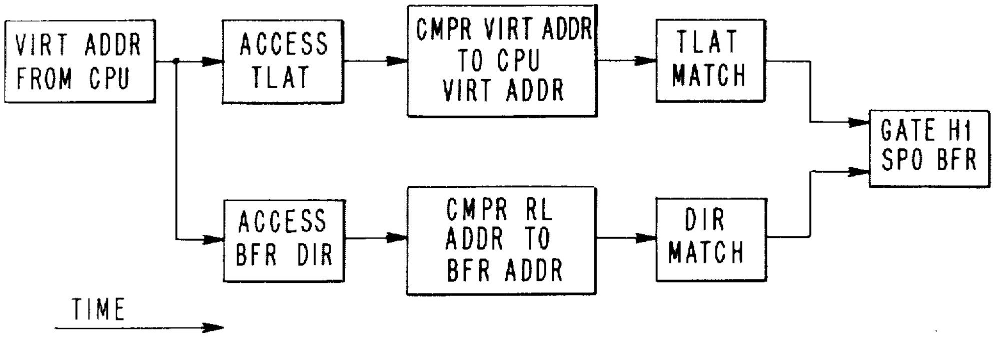
FIG. 5 is a preferred format for entries in a Translation Look Aside Table which forms one part of this invention.

FIG. 5 represents a brief summary of the functions performed by the apparatus of FIG. 4, and shows which of the functions are performed sequentially and which are performed in parallel. The virtual address from the CPU is used to access, in parallel, the TLAT and the buffer directory. Then, in parallel, the virtual address contained in the TLAT is compared to the virtual address from the CPU and the real address obtained that the TLAT is compared to the real address obtained from the buffer directory. If both of these equalities are present, there will be a TLAT match and a directory match, and the concurrent matches will be used to outgate (for reading) or ingate (for writing) the high speed buffer.

Figure 6:
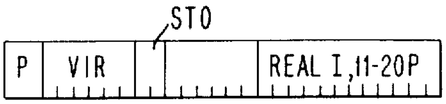
FIGS. 6a illustrates the format of the data stored in the tables shown in FIG. 4.

In the preferred embodiment of this invention, the Translation Look Aside Table contains sixty-four words, each of which contains two virtual address entries along with their respective real address entries. As pointed out above, each word contains entries for an even numbered page and entries for the next odd numbered page. When the TLAT is accessed for translation, the appropriate half of the word will be gated out by the low order bit (bit 20) of the page address portion PX of the virtual address. Some of the details of the format of the TLAT words are shown in FIG. 6. Since both halves of the word are identical in format, only one half, consisting of twenty-seven bits, is shown. It will be remembered (from FIG. 1) that the segment address portion SX and the page address portion PX of the virtual address together contain thirteen bits. In the preferred embodiment of this invention, six of those bits will be used to address that TLAT and, as was mentioned above, a seventh bit will be used to select an appropriate half of that TLAT word. Thus, only six bits of the virtual address, designated VIR in FIG. 6, need be stored in the TLAT entry. A twelve bit portion of the word contains the ten real address bits that form the translation of the SX and PX portions of the virtual address, as well as an I bit and a P (parity) bit. Two encoded validity bits, labeled STO, are also associated with each TLAT entry in the preferred embodiment. These bits are used to indicate when an entry is valid or invalid. When an entry is valid, it can refer to one of three different address spaces, depending on the value of the encoded STO bits. The STO (Segment Table Origin) values corresponding to the encoded bits are kept in local store, and their assignment is controlled by the microprogram contained within a microprogrammed control store. The four configurations of these STO bits are given the following meanings: 00 represents an invalid entry; 01 represents a valid entry associated with the first STO value contained in local store; 10 represents a valid entry associated with the second STO value retained in local store; and 11 represents a valid entry associated with the third STO value retained in local store. Whenever the control register (see FIG. 2) is loaded with a segment table origin address, the microcode determines if it corresponds to one of the three current STO values in local store. If the STO being loaded does not correspond to an existing STO value, then an assignment is made. If all three encoded STO's are active, and none of them compares with the new value, the oldest one is purged from the TLAT and the encoded bits are reassigned to the new value.

The TLAT is addressed using three virtual bits of SX (bits 13, 14 and 15) and three virtual bits of PX (bits 17, 18 and 19) to select one of the 64 locations. The lowest PX bit (bit 20) selects the odd or even entry. The virtual address bits that are mapped into the TLAT are, for this preferred embodiment, bits 8, 9, 10, 11, 12 and 16. To translate a virtual address, the TLAT is interrogated at one of the sixty-four addresses and the odd or even entry selected. The remaining high order virtual bits in the address provided by the CPU are compared to the high order virtual bits read out of the TLAT. If a match is indicated, the translated address is obtained from the real address field. The real address is then compared against the buffer directory to determine if the address has been mapped into the high speed buffer. If the address is not in the buffer, main storage is referenced. When a translation is not found in the TLAT, the system performs the translation (see FIG. 2) and maps it into the TLAT. At the same time, in the preferred embodiment, the corresponding odd or even page is also translated (if valid) and mapped into the TLAT, thus performing two translations at once.

Figure 7:
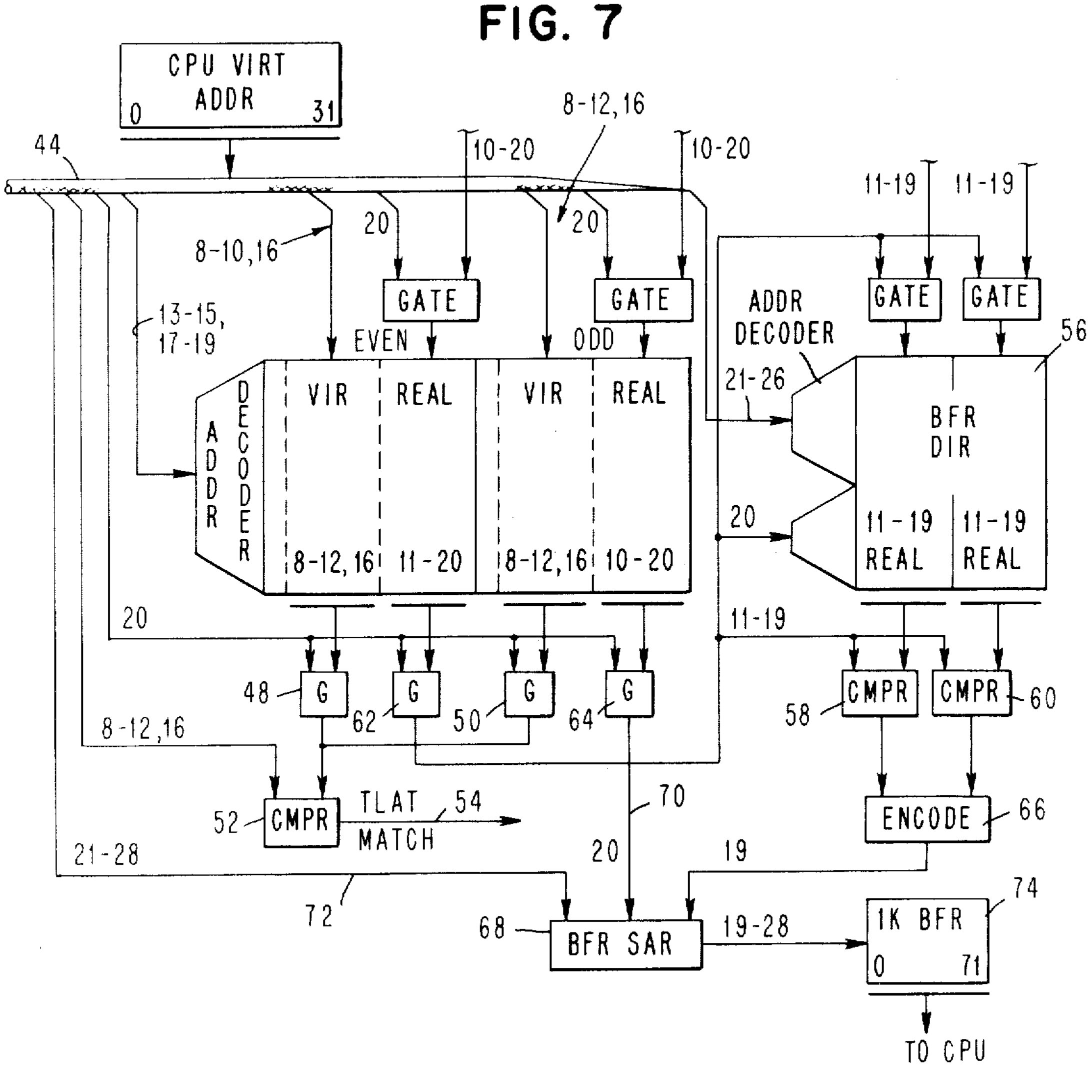
FIG. 7 is a more detailed block diagram of the circuit in FIG. 4.

Additional details of the preferred embodiment of the invention are shown in FIG. 7. Bits 8–31 of the virtual address supplied by the CPU are supplied to a storage address bus 44 for distribution within the data processing system. Bits 13–15 and 17–19 are used to address the Translation Look Aside Table 46 which contains virtual address bits 8–12 and 16. The portion of the TLAT which contains translations for even virtual addresses furnishes these virtual address bits to gating circuitry 48, while the portion of the TLAT which contains odd virtual addresses furnishes these virtual address bits to gating circuitry 50. If bit 20 of the virtual address is a 0, it will cause gate 48 to pass the six virtual address bits to comparison circuitry 52; if bit 20 is a 1, it will cause gate 50 to pass virtual address bits from the odd portion of the TLAT to comparison circuitry 52. Bits 8–12 and 16 of the virtual address provided by the CPU are also furnished to comparator 52. If comparator 52 receives inputs that are equal to each other, it will generate a signal on line 54 indicating a TLAT match. At the same time that the TLAT is being accessed, the buffer directory will be accessed by bits 21–26 of the address provided by the CPU. These bits of the virtual address correspond to real main memory locations. Therefore, their use in addressing the directory 56 is compatible with the real address orientation of the buffer memory. In the preferred embodiment, the buffer directory contains one hundred twenty-eight words, each of which contains two real addresses. Bits 21–26, therefore, access two real addresses. Selection between these two addresses is made by decoding at the output of the directory 56 with the twentieth bit of the real address. Determination of the twentieth real bit must, of course, await the opening of gate 62 or 64 as described hereinabove. However, once the twentieth bit is set, one of the two real addresses contained in the buffer directory is read out into one of two comparison circuits 58 or 60. At substantially the same time, a real address from the appropriate (even or odd) portion of the TLAT 46 will be gated by gate 62 or 64 (depending upon whether bit 20 is a 0 or a 1, respectively) to comparators 58 and 60. If either of the comparators detects equality at its inputs, encoding circuitry 66 will, based upon which of the comparators sensed the equality, generate bit 19 of the real address and transmit it to the buffer storage address register 68. At substantially the same time, bit 20 of the real address will be transmitted via line 70 from the TLAT 46 to address register 68 and bits 21–28 of the real address will be transmitted via line 72 from storage address bus 44 to address register 68. Bits 19–28 contained in buffer storage address register 68 will be used to access one of 1,024 words stored in high speed buffer 74 for transmission to the CPU. Bits 29–31 (the low order real address bits) of the virtual address supplied by the CPU need not be utilized in accessing the high speed buffer because, in the preferred embodiment, each word in the buffer contains eight bytes of data, each byte consisting of eight data bits plus one parity bit. The CPU will utilize the three order bits (bits 29–31) to select one of the eight bytes read from the high speed buffer. If neither comparator 58 nor 60 has sensed an equality (no buffer directory match — data not in high speed buffer) or if comparator 52 had not sensed an equality (no TLAT match — translation not already available) the situation would be handled in the manner discussed above with respect to FIG. 4.

Figure 8:
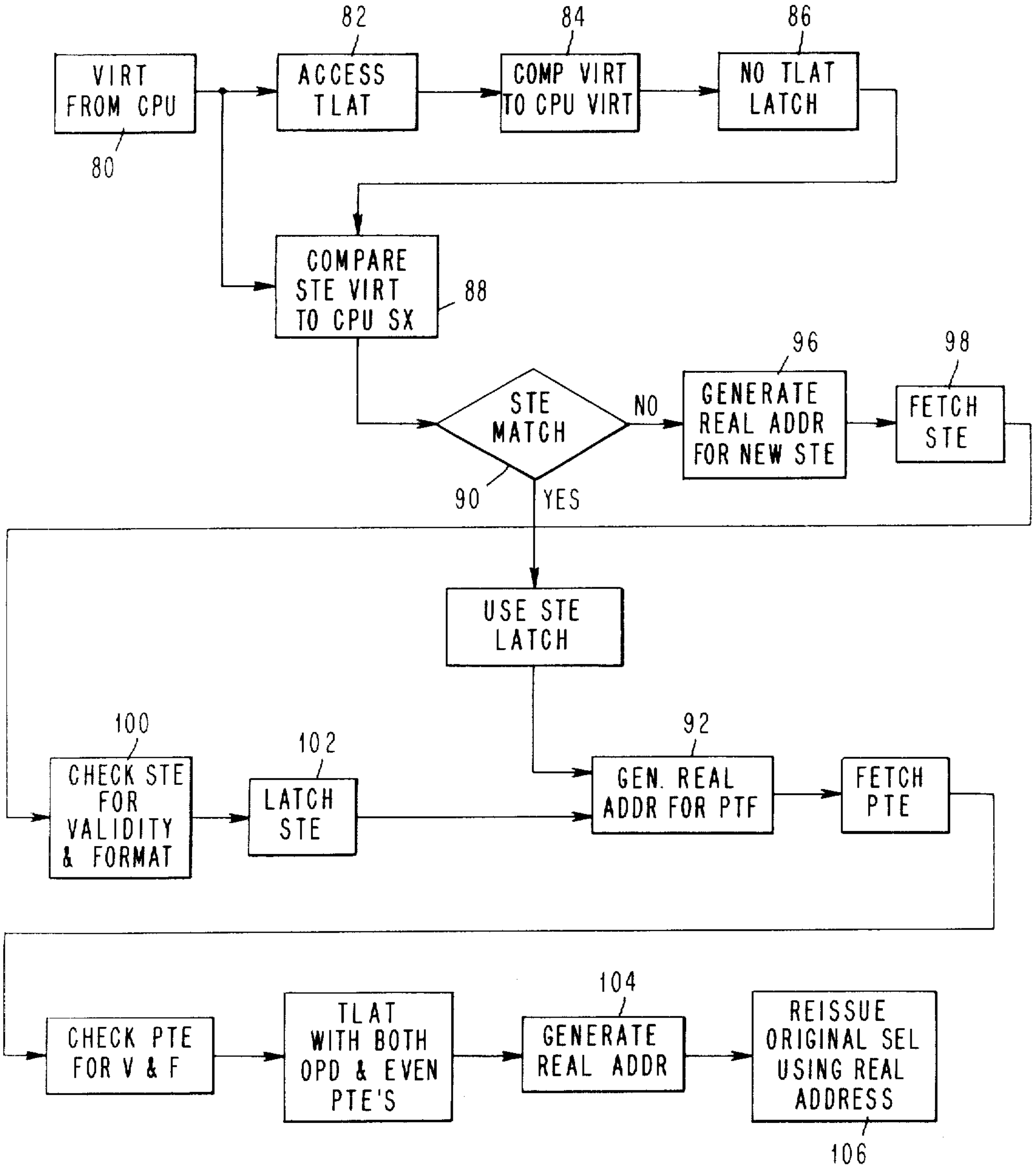
FIG. 8 is a signal flow diagram of the invention.

Referring now to FIG. 8, the virtual address 80 provided by the CPU interrogates 82 a Translation Look Aside Table (TLAT). The CPU virtual address is compared 84 with the TLAT virtual address and if a comparison is made the real address stored in the TLAT is used to access storage for the required data as described above. We will now deal with the techniques of the translation process when the CPU virtual address and the TLAT virtual address do not compare 86.

Simultaneous to comparing the virtual addresses at the TLAT, the SX portion of the CPU virtual address is being compared 88 with the STE latch virtual address. This latch contains the last translated Segment Table Entry (STE) and its associated virtual address. If there is no TLAT match and a STE match is realized 90 then, in accordance with the present invention, the translation process bypasses the segment locating portion and goes directly to the page look-up portion 92. If there is no match 94 on the STE latch comparison, then the STO is added to the SX portion of the virtual address in the DAT adder and a real address is generated 96 for the STE. The new STE is then fetched 98, checked 100 and latched 102 for later use. Then the new STE is used to generate a new address for the page table entry. Just as the previously stored PTE was used to generate the PTE. In both cases then the PTE is used to generate the real address 104 corresponding to the requested virtual address and the real address is used to access the memory.

Figure 9:
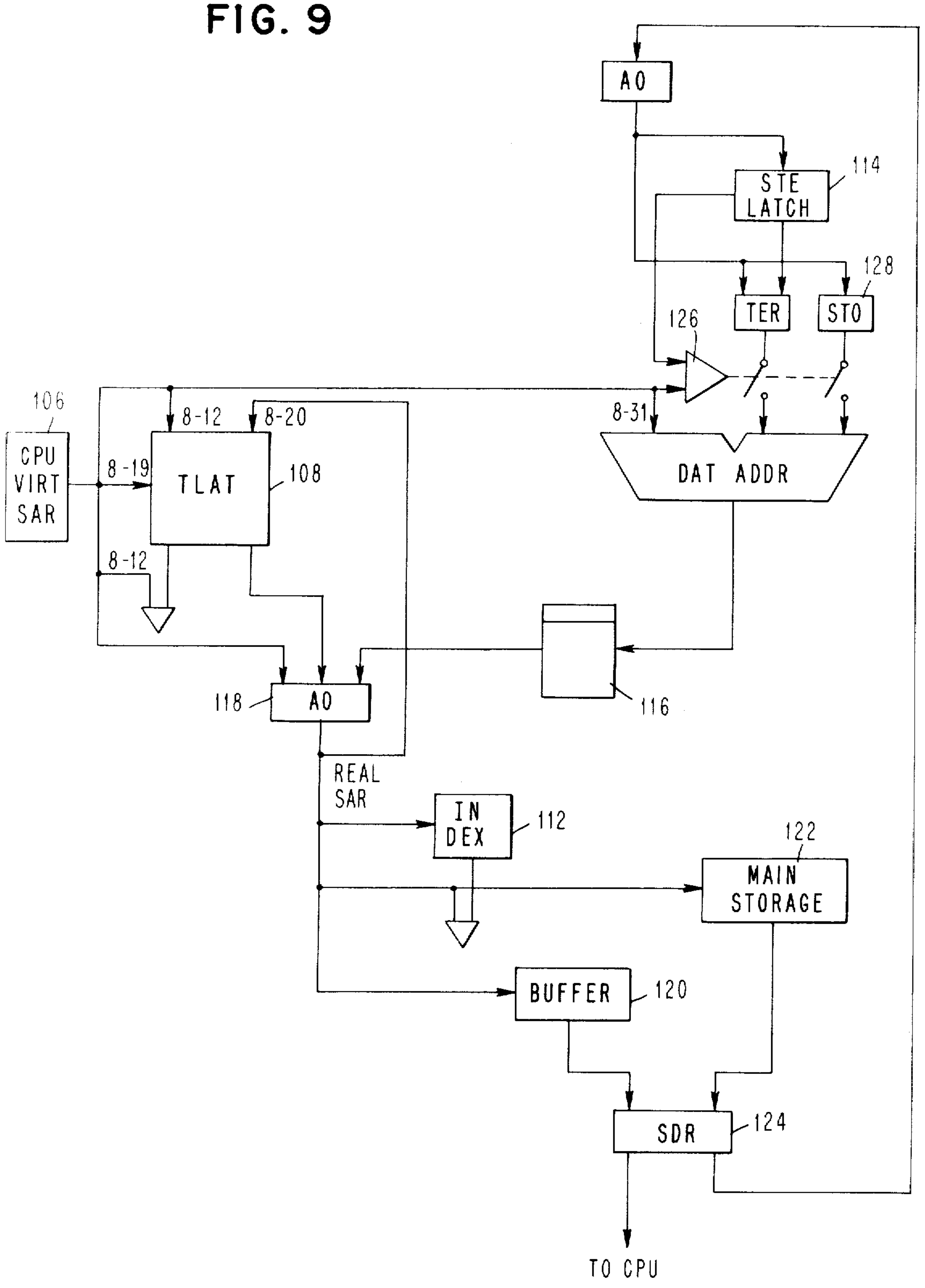
FIG. 9 is a block diagram of one aspect of the invention.

The structure for performing the above steps can be seen by reference to FIG. 9. The virtual address bits are supplied from the CPU register 106 to the TLAT 108, the DAT adder 110 and the buffer directory 112 in parallel. As pointed out previously, bits 13–19 access the TLAT, bits 21–26 access the buffer directory and all the bits 8–31 are provided at the input of the data adder. If a comparison check of the bits read out of the TLAT 108 and the buffer directory 112 is positive the data adder is incapacitated and the output of the TLAT is used to access the buffer as previously described in connection with FIG. 7.

If the TLAT does not contain a virtual address the data adder 110 must be used to generate it as described in connection with FIG. 2. The first step in this process is to compare the SX bits of the virtual address with SX bits stored in the STE latch 114 which stores the SX bits from the last translated virtual address along with the data in the segment table entry (segment table entry or STE). If the SX bits of the new virtual address are identical to those stored in the STE latch, then the segment table entry stored in the latch is added in the DAT adder to the page portion of the address to generate the address of the page table 116. The information is then read out of the page table entry and concatenated to the byte portion of the virtual address in the AND/OR logic 118 and used to access the buffer when the buffer 120 initially contains the requested data or after it has been supplied to the buffer from main storage 122 through the SDR register 124.

If a comparison in comparator 126 of the SX portion of the virtual address with that stored in the STE latch does not agree, then a full translation of the virtual address, as described in FIG. 2, must be made and the STO 120 is referred to to initiate the translation sequence in the DAT adder. When this new translation procedure is completed the STE latch is updated by inserting the contents of the segment table in the position accessed during the new Translation.

Therefore, the problem that this invention has solved is to perform address translation transparent to the microcode and to do so as fast as possible to keep the system performance degradation to a minimum.

Although in describing the preferred embodiments of the invention, various parameters were specified either explicity or implicitly, those skilled in the art will readily recognize that this invention is not limited to the formats and sizes described above. (An example of an implicitly specified parameter is the size of the main or "backing" store. Since the size of the virtual memory was given as being over sixteen million bytes, and thirteen bits of the virtual address were shown to be translated into ten bits of a real address, it is clear that the real address utilized in the preferred embodiment contains somewhat over two million bytes of data.)

It will also be recognized that the term "virtual memory" and "virtual address" need not be limited to the definitions used herein. Essentially, a virtual address is an address which is changed prior to its utilization to access storage.

Those skilled in the art will further recognize that buffer accesses need not necessarily be delayed until the address comparisons have been completed. Access to the buffer could be initiated, for example, by the virtual address and, depending upon the result of the address comparisons, system usage of data read from the buffer could be inhibited (degated) later in the cycle. In such a system, the buffer would still be real-address oriented in the sense that its buffer directory would still contain real addresses.

While the invention has been particularly shown and described with reference to a preferred embodiment thereof, it will be understood by those skilled in the art that the above and other changes in form and details may be made therein without departing from the spirit and scope of the invention.

What is claimed is:

1. In a data processing system which contains a central processing unit, a main storage having n addressable locations each addressable by a real storage address, a buffer storage having fewer than n addressable locations each addressable by a real storage address, addressing means providing virtual addresses each having a virtual portion which is made up of bits that do not constitute a portion of a real storage address and a real displacement which is made up of address bits that constitute a portion of a real storage address, and translation table means for translating the virtual portions of the virtual addresses to real address portions other than said displacement, an improved translation storage means comprising:

an accessing means for reading a plurality of real addresses from said translation table means each time a translation of one of the virtual addresses is requested;

storage table means for storing real addresses of data contained in main storage, each plurality having been obtained from said accessing means each time a translation of a virtual address is requested, said storage table means including addressing means for simultaneous accessing of all the plurality of read addresses received from one translation request; and decode means for distinguishing between all said plurality of real addresses received from one translation of a requested virtual address to obtain the real address of the requested virtual address from the simultaneously accessed plurality of the real address.

2. The data processing system of claim 1 including means for storing the contents of said translation table means after one translation has been made so that it can be used in making a section translation.

3. The data processing system of claim 1 wherein said accessing means includes means for obtaining the plurality of real addresses by translation therein from virtual addresses having consecutive binary numbers for their virtual portions.

4. In a data processing system which contains a central processing unit, a main storage having n addressable locations each addressable by a real storage address, a buffer storage having fewer than n addressable locations each addressable by a real storage address, addressing means providing virtual addresses each having a virtual portion which is made up of bits that do not constitute a portion of a real storage address and a real displacement which is made up of address bits that constitute a portion of a real storage address, and translation table means made up of the series of tables for translating the virtual portions of the virtual addresses to real address portions by using said tables in sequence to modify the virtual portions of the virtual addresses, an improved translation means comprising:

additional storage means for retaining data obtained from one of the tables in the sequence that is used to access another table in the sequence, and means for using that retained data in the next translation when said output of said one table is needed to make translation thereby reducing the time needed to perform the next translation.

5. The data processing system of claim 4 wherein said tables include page tables and a segment table containing references to said page tables and said one table is a segment table.

* * * * *

PO-1050
(5/69)

UNITED STATES PATENT OFFICE
CERTIFICATE OF CORRECTION

Patent No. 3,825,904 Dated July 23, 1974

Inventor(s) J.L. Burk, et al

It is certified that error appears in the above-identified patent and that said Letters Patent are hereby corrected as shown below:

Column 10, line 22, the word "section" should read --second--. Column 10, line 48, after "make" and before "translation" insert -- the next--.

Signed and sealed this 29th day of October 1974.

(SEAL)
Attest:

McCOY M. GIBSON JR.
Attesting Officer

C. MARSHALL DANN
Commissioner of Patents